FIG. 1

INVENTORS
RALPH D. THOMPSON
NORMAN R. NATHANSON
BY Kenway, Jenney & Hildreth
ATTORNEYS

FIG. 2

INVENTORS
RALPH D. THOMPSON
NORMAN R. NATHANSON
BY
ATTORNEYS

INVENTORS
RALPH D. THOMPSON
NORMAN R. NATHANSON

ATTORNEYS

March 24, 1970 N. R. NATHANSON ET AL 3,502,127
MEAT CUTTING MACHINE

Filed Dec. 11, 1967 9 Sheets-Sheet 6

FIG. 6

INVENTORS
RALPH D. THOMPSON
NORMAN R. NATHANSON
BY

ATTORNEYS

INVENTORS
RALPH D. THOMPSON
NORMAN R. NATHANSON
BY
Kenway, Jenney + Hildreth
ATTORNEYS United States Patent Office 3,502,127
Patented Mar. 24, 1970

3,502,127
MEAT CUTTING MACHINE
Norman R. Nathanson, Natick, and Ralph D. Thompson, Arlington, Mass., assignors, by mesne assignments, to Doro-Mayo Equipment Co., Inc., Boston, Mass., a corporation of Massachusetts
Filed Dec. 11, 1967, Ser. No. 689,408
Int. Cl. B26d *3/18;* A22c *17/00*
U.S. Cl. 146—78                                17 Claims

ABSTRACT OF THE DISCLOSURE

This invention is an apparatus for automatically dicing meat. It comprises a conveyor belt having upwardly projecting pins thereon which carry the meat toward a plurality of rotating cutting knives positioned above the conveyor belt, the knives being spaced apart to cut the meat into longitudinal strips. After the cut meat leaves these knives, a single knife, reciprocably movable across the conveyor belt, cuts the strips into separate cubes of meat. As the conveyor belt moves to the exit end of the machine, the pins are automatically withdrawn from the cut pieces of meat, thus releasing the latter to fall into a receptacle placed below the end of the machine.

BACKGROUND OF INVENTION

While the method and structure of the subject invention are widely applicable in many materials handling situations, the invention will be disclosed and described in connection with a particular problem, namely, the difficulty heretofore encountered in dicing raw fresh meat, this being a good example for illustrating the difficulties encountered.

One of the problems encountered in the meat packing industry in attempting to automate, or at least mechanize to some degree, the process of meat cutting occurs because of the peculiar characteristics of raw meat itself. As a result of this, the cutting operations are largely carried on by meat cutters who manually cut the meat for market. While it is true that band saws are used quite commonly in meat markets today for cutting haunches and shoulders of meat into steaks and roasts, etc., nevertheless, it has not been found feasible to use band saws for the dicing of meat because of the lack of support found in the meat itself. For example, if a slab of meat is held for cutting purposes in such manner as to compress it, then the compression is deleterious to the meat. If it is held loosely, it tends to be drawn by the cutting knives into distorted shapes. Thus, although the packaging of raw cut meat may now be handled by modern machinery, it is still found necessary to employ manual labor to cut the raw meat itself, and particularly insofar as dicing is concerned.

By dicing is meant the preparation of relatively finely cut chunks of meat, as, for example, that normally marketed as meat for stewing or skewering. Furthermore, uniformly shaped and sized pieces of meat have not generally been produced for stew meat and the like, because of two problems hereintofore considered inherent in stew meat cutting. The first of these is that stew meat and the like is generally cut from irregularly shaped small pieces of raw meat remaining after the cutting of the larger conventional cuts of meat. Secondly, the small remaining chunks are very liable to contain membrane or other material which is extremely difficult to cut and hereintofore has only been successfully cut by means of manual operation in which the knife can be manipulated in an oscillating fashion to saw through the membrane or other tough substance.

SUMMARY OF INVENTION

It is accordingly an object of this invention to provide machinery for automatically dicing a quantity of irregularly shaped pieces of meat into a plurality of regularly shaped portions.

It is a further object of this invention to provide apparatus which first cuts a slab of irregularly shaped pieces of meat into longitudinal strips, and thereafter slices the strips into short lengths of the required size.

Another object of the invention is to provide apparatus for the dicing of meat in which all of the cutting operations are done by a drawing action, that is, the sharpened edge of a cutting tool is drawn through the meat in order to sever cleanly any membranes, gristle or tendons.

A still further object of the invention is to provide apparatus of any of the above classes in which the irregular slabs of meat are conveyed into the cutting apparatus by means of a conveyor belt while being held above the surface thereof, so that the cutting edges of the several cutting knives may sever completely through the meat without coming into contact with the conveyor belt itself with resulting damage thereto and to the edges of the cutting implements, the meat being supported with very little, if any, compression.

Yet another object of the invention is the provision of apparatus of any of the above classes in which means are automatically provided to remove the cut portions of meat from the conveyor belt without having to pull them off the conveyor belt manually, the cut pieces falling into a receptacle conveniently placed near the end of the apparatus.

A still further object of the invention is the provision of apparatus of the above kinds in which means are provided for stretching the meat during some of the cutting operations, thereby to obtain a quicker and cleaner cutting.

Another object of the invention is the provision of apparatus of the above classes in which the final cutting operation is done by a reciprocable knife blade, the latter cooperating with means for storing a portion of the blade's kinetic energy as potential energy at the end of each cutting stroke.

Other objects and advantages of the invention will be in part obvious and in part pointed out hereinafter.

The invention accordingly comprises the elements and combinations of elements, features of construction, arrangements of parts, and manipulation of the apparatus all of which will be exemplified in the structures hereinafter set forth, and the scope of the application of which will be indicated in the appended claims.

In the accompanying drawings, in which two of several possible embodiments of the invention are shown.

Throughout the drawings, similar reference characters indicate coresponding parts, and in the drawings dimensions of certain of the parts as shown may have been modified and/or exaggerated for the purposes of clarity of illustration and understanding of the invention.

Figure 1:
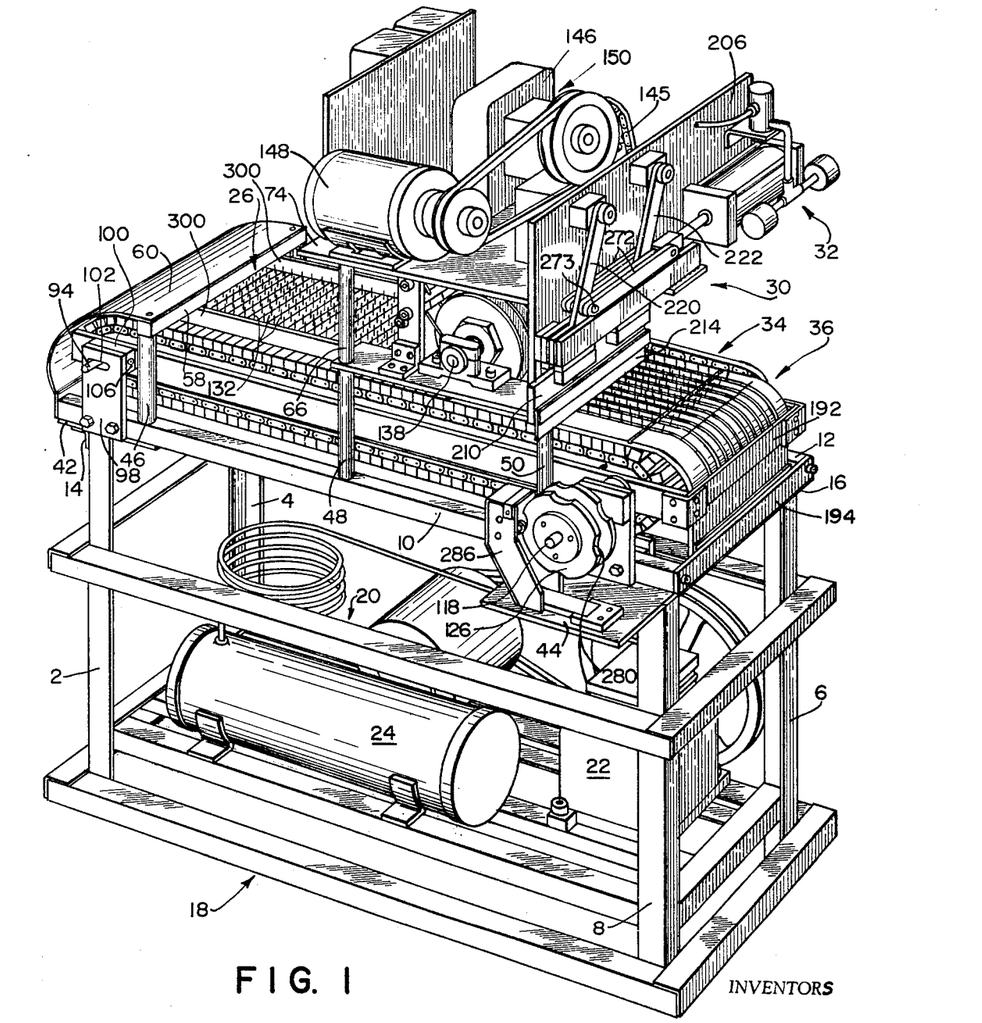
FIG. 1 is an illustration of one embodiment of the apparatus of this invention.

Referring now to FIG. 1, there is shown a general view of the apparatus of this invention comprising a base made of angle-iron and providing the legs 2, 4, 6 and 8 which support at their tops the aluminum side rails 10 and 12, and the angle-iron end bars 14 and 16. The legs 2–8 are spaced and held at their lower ends by an angle-iron bracing frame indicated generally by numeral 18, and part way up by a second bracing frame indicated generally by numeral 20 similarly made of angle-iron, the whole structure being fastened together by conventional means such as by welding. The bottom frame member 18 acts as a support for an air compressor comprising an air pump 22 and the storage tank 24, this combination being used to provide compressed air for moving a piston controlling a transverse cutting knife, as will be described below.

Figure 2:
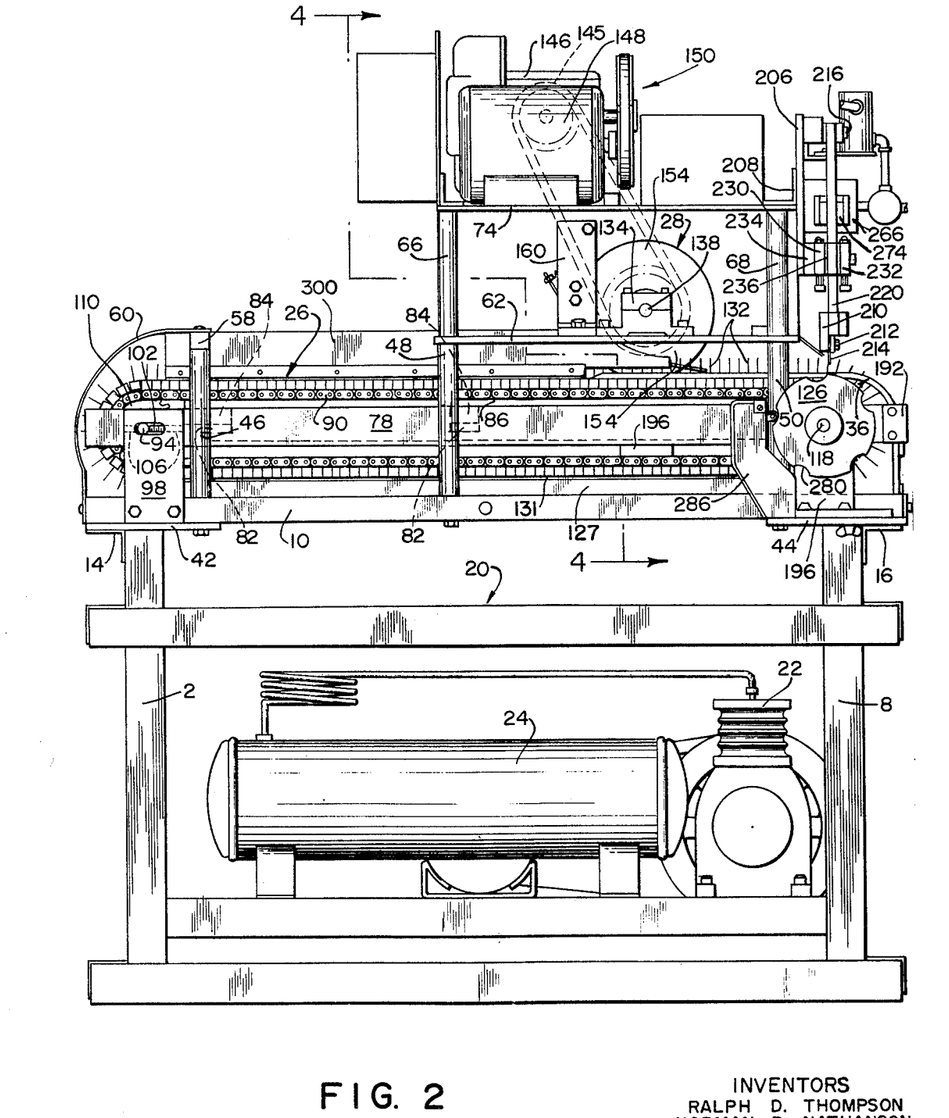
FIG. 2 is a side elevation of the apparatus, partly in section.

The cutting apparatus itself concerns five basic parts as follows: a conveyor belt indicated generally by numeral 26; first cutting means indicated generally by numeral 28, the first cutting means including in this instance a plurality of rotating circular knives; a transverse cutting means indicated generally by numeral 30; driving means for the transverse cutting means indicated generally by numeral 32; driving means indicated generally by numeral 34 for the first cutting means, for the timing means, and for the conveyor belt; and meat stripping and releasing means indicated generally by numeral 36. These will now be described.

Figures 3, 7:
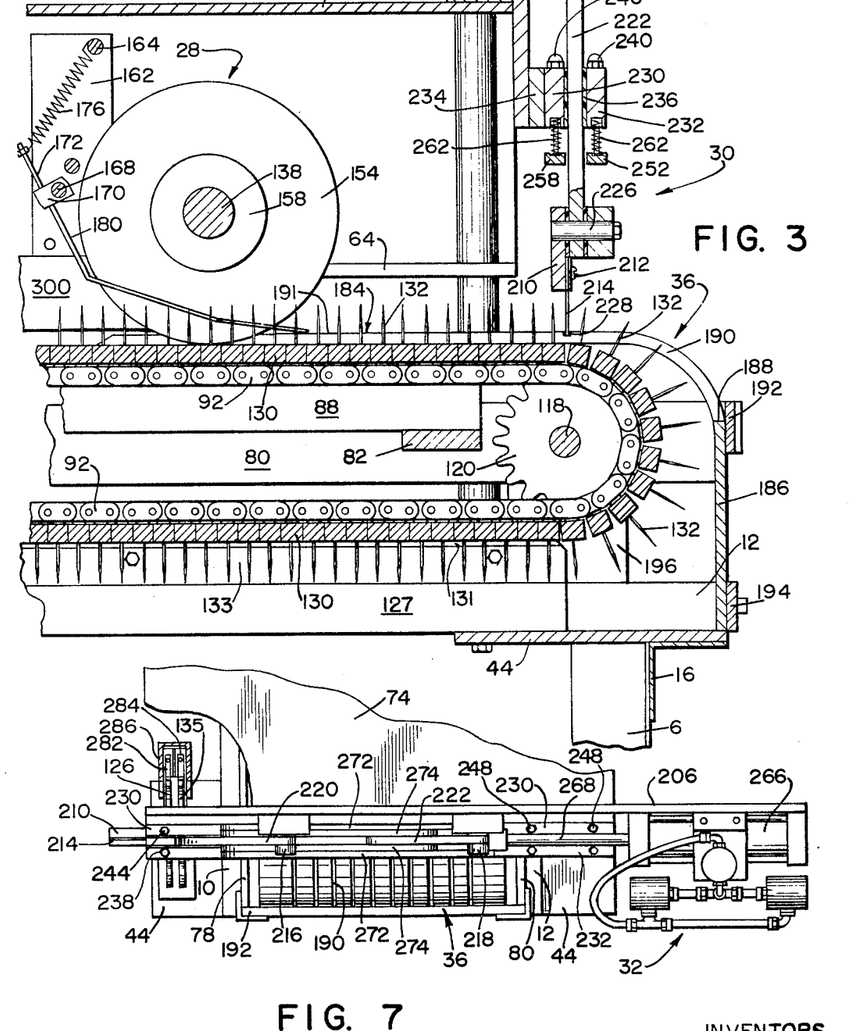
FIG. 3 is a side elevation, partly in section, of an end portion of the apparatus, given to show more clearly certain operating features and construction thereof.
FIG. 7 is a plan view of a portion of the apparatus, looking down from the top thereof.
Figure 4:
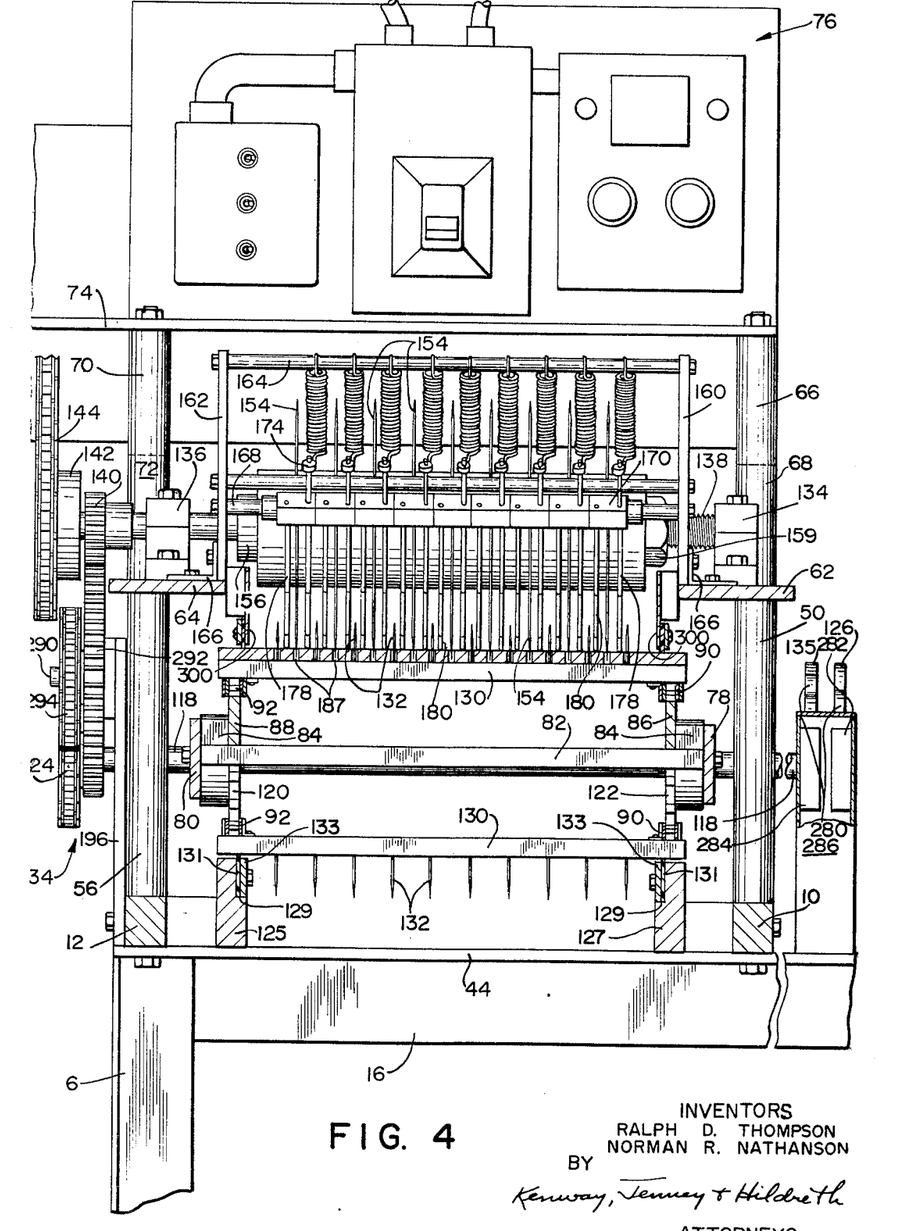
FIG. 4 is an end view in elevation of the apparatus taken in the direction of sight lines 4—4 on FIG. 2.

Referring to FIGS. 2, 3 and 4, the tops of the legs 2 and 4 are joined together by an angle-iron length 14, and similarly the tops of the legs 6 and 8 are joined together by the angle-iron length 16. Overlying the tops of the legs at each end are the two base plates 42 and 44 to which are fastened the side rails 10 and 12, the base plates providing a secure support for these rails.

Uprightly mounted on the rails 10 and 12 are the six supporting posts 46, 48 and 50 on one side of the apparatus, and 52, 54 and 56 on the other side. Spanning the tops of the posts 46 and 52 is a cross bar 58 the main function of which is to support the upper edge of a metallic shield 60, the lower edge of which is supported as shown at the end of the rails 10 and 12. Mounted on top of the posts 48 and 50 is a longitudinally extending support plate 62, and in similar manner on top of the supporting posts 54 and 56 is mounted a supporting plate 64. Mounted on top of the supporting plate 62 is a pair of supporting posts 66 and 68 on the one side, and similar posts 70 and 72 are mounted on plate 64 on the other side. The tops of the posts 66–72 support a mounting plate 74 on which are mounted an electric motor for driving the apparatus, a gear reduction unit, and the switch boxes illustrated generally by numeral 76 which serve as controls for the apparatus.

Between the posts 46, 48 and 50 on one side of the machine and posts 52, 54 and 56 on the other side of the machine, and somewhat inwardly of the vertical planes of the rails 10 and 12 are the stretchers 78 and 80 at the ends of which are mounted bearings for sprocket wheels over which a conveyor belt runs. The stretchers are held apart in parallel relationship by three cross-bars 82 fastened by their ends to the stretchers.

Fastened to the stretchers above the ends of cross-bars 82 are spacer blocks 84, and supported on the cross-bar 82 but separated from the stretchers by blocks are the guide rails 86 and 88 which underlie and support the upper reaches of the endless sprocket chains 90 and 92 respectively which together carry cross-bars 130 to form a conveyor belt as described below.

As shown in FIG. 2, at each end of the stretchers 78 and 80 there is mounted an axle, these being numbered 94 and 118 and passing slidably through suitable holes at the ends of the stretchers. At the entrance end of the stretcher frame the ends of axle 94, after passing through the holes in the stretchers, pass slidably through elongated slots 102 in support plates 98 fastened to rails 10 and 12, one on each side of the apparatus, and through similar slots in blocks 100 fastened at the tops of plates 98. Adjustable set screws 106, threaded laterally in the blocks 100 and entering the slots, serve to position the shaft 94 lengthwise in the slots, and the latter position the shaft above the rails 10 and 12. Thus this end of the stretcher frame is anchored above the bed rails 10 and 12 by use of the shaft 94 in a dual capacity. If desired, the shaft 94 may end just within the blocks 100 and be provided with a bore in each end. Rotably fitting in each bore would then be provided a stub bearing shaft, these in turn projecting through slots 102 to be held in position by screws 106, thus holding and locating shaft 94. Other suitable means for holding shaft 94 will suggest themselves to one skilled in the art.

At the exit end of the apparatus, axle 118 passes through bearings 119 which are fastened to the ends of the stretchers 78 and 80, and then passes through bearing bushings mounted in the upright supports 121 and 123. These supports are fastened by conventional means to rails 10 and 12, and thus this end of the frame made by the stretchers 78, 80 and cross bars 82 is held above the bed rails 10 and 12 by the use of shaft 118 in a dual capacity.

Supported by and attached to the plates 42 and 44 are a pair of longitudinally extending support rails 125 and 127, these supports lying under the bottom reaches of the conveyor belt to support it. The supports 125 and 127 are provided with rabbets 129 in which are held strips 131 of a slippery plastic such as nylon, the bars 130 (described below) which form the conveyor riding on these strips of plastic. The support rails 125, 127 are fastened by conventional means to the plates 42 and 44. The strips 131 may be held in place, as shown, by means of elongated metal clamping strips 133.

Rotatably mounted on the axle 94 by conventional means with proper bushings and spacing collars are the sprocket wheels 110, one at each end of the axle, and aligned longitudinally with the guide bars 86 and 88. On these sprocket wheels are trained, respectively, the sprocket chains 90 and 92.

Figure 5:
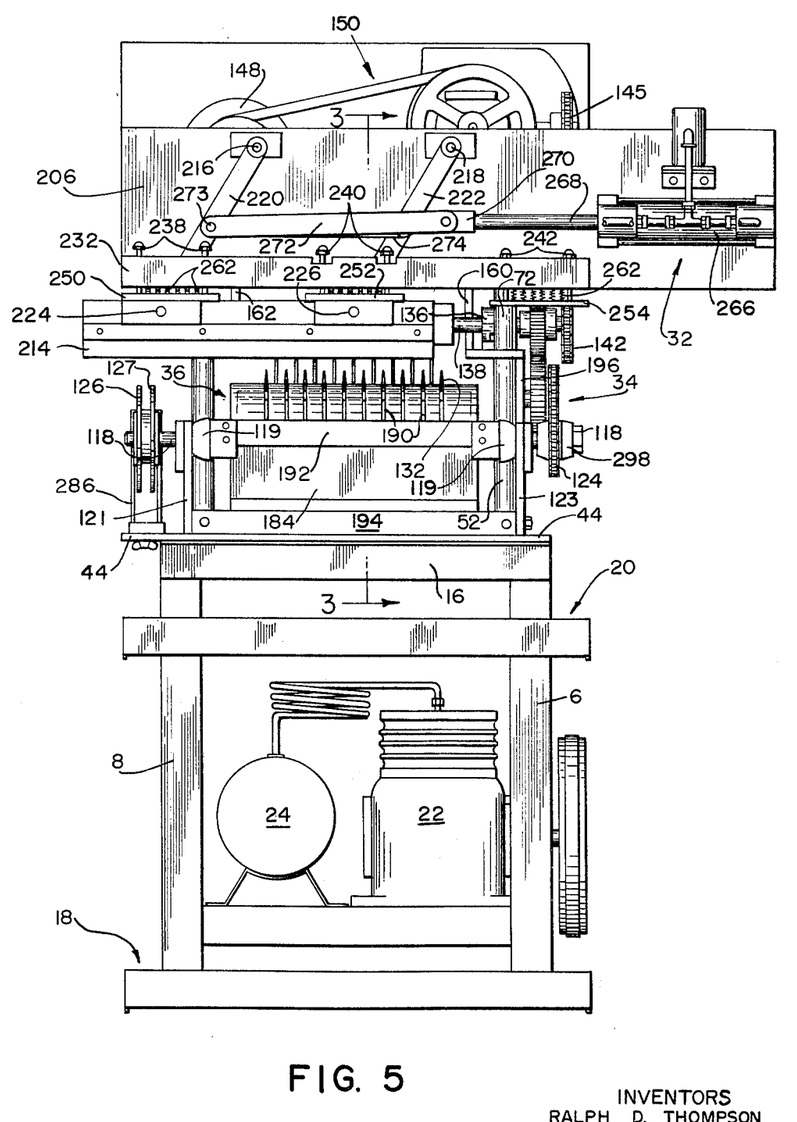
FIG. 5 is an end view of the apparatus.

To the driven axle 118 are attached for rotation thereby a pair of sprocket wheels 120 and 122, one on each side of the apparatus and in alignment with guide bar 86 and 88. (See FIG. 4.) The axle 118 extends laterally of the machine as shown in FIG. 4 in both directions, and one end of axle 118 has attached thereto the sprocket wheel 124 (see FIG. 5) and the other end (see FIGS. 2 and 7) has attached to it the cam wheels 126 and 135. Therefore, as the sprocket wheel 124 is driven, it rotates the axle 118 which in turn will drive the sprocket wheels 120, 122, and said cams. Sprocket chain 90 is trained over the sprocket wheel 122 and sprocket chain 92 is trained over the sprocket wheel 120. Shaft 118 thus drives the conveyor belt.

Mounted upon a stub shaft 290 which is fastened to a supporting plate 196 is a spur gear 292 which meshes with spur gear 140. (Supporting plate 196 is fastened by conventional means to the rail 12.) Attached to the spur gear 292 and coaxial therewith is a sprocket wheel 294. A sprocket chain 296 is trained on sprocket wheels 124 and 294.

By providing the proper ratio of diameters of the several gears in the gear train that extends from the output sprocket 145 of the gear-reducer 146 down to the conveyor belt drive sprocket 124, the relative speeds of the conveyor belt, the cutting knives 154, and the cam wheels 126–127 may be adjusted. As an example, if the conveyor belt is driven at one inch per second, then using cutting knives 154 of approximately six inches diameter, it is preferred to rotate the knives at approximately twenty-seven r.p.m.

As an additional feature, if desired, the sprocket 124 may be mounted upon the shaft 118 by means of a friction clutch 298 of conventional nature, so that if the conveyor belt meets an obstruction or per chance meat begins to jam up against the cutting knife 214, the clutch will slip, and thus sprocket 124 will cease driving the conveyor belt until the obstructions are removed or the meat cleared.

To form the conveyor belt, there are attached to the sprocket chains 90 and 92 a plurality of metal bars 130, each bar having approximately a square cross section although other cross-sectional shapes could be readily used. Each bar extends laterally across the apparatus, and is attached at each end thereof to the links of the sprocket chains 90 and 92 in conventional manner so as to be carried by the chains. It will be noticed as a feature of the apparatus, that as the bars 130 lie on the upper and lower reaches of the loops of sprocket chains, normals to the top faces of the bars are substantially parallel. On the other hand, as the sprocket chains pass around their respective sprocket wheels, it will be noticed that said normals take an angular relationship to each other, that is, become extensions of the radii of the sprocket wheels. Use is made of this shift in the angular relationships of the normals, as will now be described.

Firmly mounted in every bar 130 and spaced laterally and equidistantly across each bar (and thus forming a series of longitudinally extending rows) is a plurality of meat holding pointed pins 132, these pins being preferably stainless steel and fastener perpendicularly into the conveyor belt bars by conventional means such as welding or swaging. These pins, therefore, lie along the said normals. (It has been found practical to separate the pins by approximately one and a quarter inches laterally, and as viewed and used in practice, there are ten pins for each of the conveyor bars.) As shown in FIG. 3 (right-hand or exit end of the machine as so viewed) when the conveyor bars pass around the sprocket wheels, the pins become angled with respect to each other with the result that their pointed ends spread apart a greater distance than is the case when meat is first placed on the pins, ie., when the pins are approximately parallel.

This feature is used to tension meat when it is being cut laterally, as will be described below. The bars themselves may be made of aluminum if desired to reduce the weight of the apparatus; or they may be made of steel or stainless steel. For sanitary reasons, it is probably better to make the bars of stainless steel.

Supported in a pair of bearings 134 and 136 on the supporting plates 62 and 64, respectively, is a transverse driven axle 138. One end of the axle 138 extends to the left as viewed in FIG. 4 and to this end is attached spur gear 140. Axle 138 also has attached at this end a sprocket wheel 142 which is driven by a sprocket chain 144, which in turn is driven by the output sprocket wheel 145 of a gear reduction unit 146. Unit 146 is driven by an electrical motor 148 by a conventional pulley system indicated generally by numeral 150, these units (144–150) being mounted on top of the support plate 74.

Mounted on the axle 138 is a plurality of rotatable cutting knives or discs 154, these cutting knives being indicated by numeral 28 generally in FIG. 2, and being mounted on the axle 138 by a bearing shoulder 156 fastened to shaft 138, spacers 156, and nut 159 theaded on the shaft. By tightening the nut, the blades and spacers are placed under compression, sufficient to turn the knives to cut meat but allowing a slip if the knives should strike a bone or other hard material. The height of the axle 138 above the top surface of the conveyor belt bars 130 is such that the sharp edges of the knives just clear this top surface. It will be noticed that the pins 132 project up between the knives, and that each knife is centered approximately midway between each longitudinal row of pins.

Also mounted on the plates 62 and 64 are the upright brackets 160 and 162 (see FIGS. 3 and 4), the upper ends of these brackets being spanned by the rod 164. Brackets 160 and 162 may, of course, be welded to the supporting plates 62 and 64; but, as shown, they may be attached thereto in conventional manner by angle-iron brackets 166. A shaft 168 extends between brackets 160 and 162, and on the shaft are rotatably mounted a plurality of blocks 170, there being one block for each of the circular knives. Through each of the blocks 170 passes a stout extension rod 172, to the end of which is adjustably fastened (as by a conventional set-screw, not shown) a bushing 174. Beneath each bushing 174 is fastened one end of each of a plurality of tension springs 176, the upper end of the tension springs engaging the shaft 164. From the other side of each block 170 there extends a pair of stout, depressor fingers 178 and 180, these fingers being made of a spring metal such as spring steel and being bent as shown in FIG. 3 so as to lie between the knives 154 while extending rearward at least as far as a plane vertical to the conveyor belt and tangent to the back periphery of the knives 154. (See FIG. 3.)

It will be noticed (see FIG. 4) that as to each pair of pins 132 the following order of elements occurs. First comes a finger 178, then a knife 154, then a second finger 180 from the same block 170, and then the second pin of the pair being considered. This same sequence is followed throughout the lateral span of the knives 154 on the axle 138. The function of the fingers 178 and 180 is to help knives 154 to press meat down onto the pins 132 and toward the conveyor belt as the meat is being cut by the knives into longitudinally oriented strips, and to strip cut meat from the knives. The function of the tension springs 176 is, of course, to provide a downward thrust or bias of the fingers for this purpose. The force of the thrust can be adjusted first by bending the fingers suitably and then by adjusting the position of engagement by the ends of springs 176 on the rods 172.

In the remarks directed to the advantages of the apparatus, attention was drawn to the fact that automatic means are provided for removing cut meat from the machine, such means being readily detached and cleaned. This portion of the apparatus will now be described.

Referring now to FIGS. 1, 3, 4, and 6, overlying the exit end of the conveyor belt is a slotted stripper and meat-releasing platform indicated generally by numeral 36 and having an overlying portion 184 and a downwardly-curving dependent portion 166. The overlying portion 184 is provided with slots 187 through which the knives 154 pass freely, and with additional slots 190 which extend the entire length of portion 184 and extend to a position part-way down the portion 186 as indicated by numeral 188. Slots 187 preferably extend the same distance for ease in manufacturing the plate. As many slots 190 are provided in the structure as there are longitudinal rows of pins 132 since the pins must traverse the slots of the overlying portion 184 while meat is being cut by the knives 154. The tongues 191 formed by the slots lie between the knives 154, and underlie the fingers 178.

Figure 6:
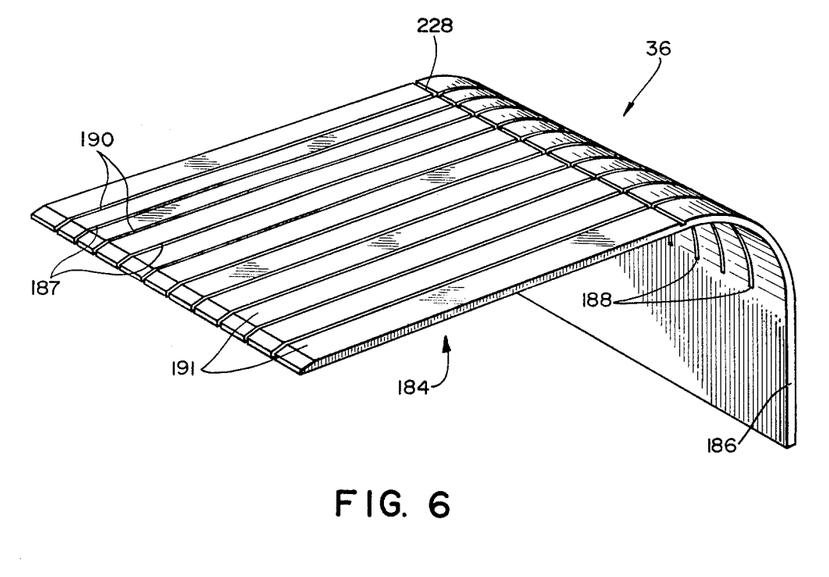
FIG. 6 is an illustration of a stripper plate used in the apparatus.

The guide plate 36 is fastened in position on the exit end of the machine by laterally extending cross-bars 192 and 194, so as to overlie the conveyor belt foth tongues 191 between the rotating knives, and aligned so that the pins 132 on the conveyor belt may traverse slots 190. Bar 194 is fastened to the ends of the rails 10 and 12, and bar 192 is fastened to the ends of stretchers 78 and 80. The downward extending portion 186 is detachably bolted to these bars by conventional means. If desired, but not shown, adjustable means may be provided for moving the meat releasing plate laterally on the machine in order to make sure that the pins on the conveyor belt will properly pass through the slots 190.

Referring to FIG. 3, it will be observed that dependent portion 186 of the stripper plate 36 is positioned longitudinally on the apparatus so that as the pins 132 reach the downward bend of the dependent portion 186 and continue, the pins are gradually drawn radially away from the stripper plate. As a result, a point is reached at which the pins are withdrawn entirely within the plate 36, and thus from any meat attached on the pins. (See FIG. 3.) Meat thus released is then free to fall from the stripper plate into a receptacle placed below portion 186.

Since the purpose of the machine is to dice meat, means will now be described for cutting the meat transversely. It is to be noted that, at this point, the meat is no longer a solid piece of meat but has been divided into longitudinal strips which are anchored on the pins 132.

Mounted on a supporting plate 206 which is fastened by means of a bracket 208 to the plate 74, is the transverse knife mechanism indicated generally by numeral 30. The mechanism comprises a knife-holding bar 210 on which is mounted by conventional means (such as the screws 212) a knife blade 214. Bar 210 forms one side of a parallelogram the opposite side of which is defined by the imaginary line drawn between two pivots 216 and 218 which are fastened to the plate 206, the said line being parallel to the conveyor belt top surface. The other two sides of the parallelogram are swinging arms 220 and 222 which are conventionally pivoted on pivots 216 and 218, and are pivoted to the bar 210 by the pivots 224 and 226. Thus, it will be seen that as the arms 220 and 222 swing on their pivots, the knife 14 swings from one side of the conveyor belt to the other side, descending toward and away from the conveyor belt, as it swings. The knife 214 is positioned so that in its furthest position downward, its cutting edge will lie slightly below the top surface of the stripper plate 36. A groove 228 extending transversely across the stripper 36 is provided to receive the knife edge so that the latter will not touch the stripper but will lie the top surface thereof in said position. Thus, any meat that is cut by blade 214 as it swings back and forth will be severed cleanly and completely.

The arms 220 and 222 swing between a pair of guide bars 230 and 232 which are spaced apart sufficiently to provide a smooth sliding fit for arms 220 and 222. Bar 230 is spaced from the plate 206 by means of a spacer 234, and the bars being fastened at their ends to plate 206. If desired, strips 236 of a plastic such as nylon may be placed along the inner surfaces of the guide bars 230 and 232 in order to act as slippery guide surfaces for the passage of the arms 230 and 232 back and forth between the guide plates.

Extending through the guide bar 232 are three pairs of slidable guide pins, the pairs being numbered 238, 240 and 242. A similar set of slidable pins extends through the guide bar 230, these pairs being numbered 244, 246 and 248. Each of the guide pins is provided with a head as shown to stop the downward movement of the pin beyond a predetermined point and at the end of each pair of pins is provided a pressure pad 250, 252, and 254 below bar 232, and similar pressure pads 256, 258 and 260 are provided at the ends of pairs of pins 244, 246 and 248.

Between the pressure pads and the under edge of the guide bars 230 and 232 are mounted a series of compression springs 262 to bias the pads downwardly. It will be observed that when the structure 210 holding knife 214 is at one of its extreme positions (see FIG. 5) it compresses the compression springs 262 via the 250, 252, 256 and 258. Its other end has cleared the pressure pads 254 and 260. On the other hand, (but not illustrated) when the knife is at its extreme other position, it will press up against the pressure pads 252 and 254 dependent from bar 232 and against pads 258 and 260 dependent from guide bar 230, being clear of the pressure pads 250 and 256. Thus, when the knife starts a downward and lateral swing for each stroke, the stored potential energy of the compression springs 262 add to the force which is being used to drive the knife, thus giving the knife an extremely quick acceleration and thus making the traverse time of the knife across the conveyor belt very short. At the other end of its stroke, the momentum of the knife and its supporting structure including the arms 220 and 222 is such as to convert part of its kinetic energy into potential energy used to compress the springs 262 which are then ready to release this energy, as stated above, on a return trip of the knife.

Also attached to the support plate 206 is a pneumatic cylinder 266 which is double acting. That is, it requires a positive impulse of the actuating fluid on one side of the piston of the cylinder to move the latter in one direction, and a positive impulse of fluid in the other side of the piston to move it back to its first position. Since the details of the hydraulic circuitry for such a piston, and the electromagnetic valve used to operate it, are conventional, no further description will be given here.

The piston rod 268 of the cylinder is connected by means of the conventional clevis 270 at its end to a pair of link members 272, the other end of the links 272 being pivoted to the arm 220 by conventional pivot 273 as shown. Arms 220 and 222 are connected together by a pair of connecting links 274, one end of each of the links being engaged by pivot 273, and the ends of the links being conventionally pivoted to arm 222 by a pivot (not shown). Operation of the piston will therefore cause the knife 214 to move toward and away from the conveyor belt.

Each of the cams 126 and 135 is provided with notches 280 as shown. Cam wheel 126 operates a micro-switch 282 and cam 135 operates the micro-switch 284, these switches being mounted in housing 286 mounted on the plate 44. It is these micro-switches that control the valve mechanism for the cylinder 266, and when the micro-switch 282 is operated by having its follower enter a notch on the cam wheel 126, the piston rod 268 moves in one direction to swing the knife 214 across the table from a first position to a second position. When micro-switch 284 is operated by cam 135, the piston rod is caused to move in the other direction to swing the knife across the table from the second position to the first position. Finally, in order to guide the meat laterally on the conveyor belt, a pair of side plates 300 are conventionally mounted above the top surface of the conveyor belt.

In actual practice, the rotary knives 154 were made about six inches in diameter, the gearing 4 driving the conveyor belt such as to give a speed of approximately one inch per second. The piston 266 and the air pressure used are such that the time for a complete stroke of the knife blade 214 from one side of the conveyor belt to the other is approximately 37 milliseconds. Each of the arms 220 and 222 is approximately 10¾ inches long. The bars of the conveyor belt as the machine has been made and used successfully are approximately ½ inch in cross section on a side by 12 inches long.

The operation of this embodiment is as follows:

With the parts assembled as shown in the several drawings, and with the motor 148 and compressor 22 both running, a slab of meat is placed on the moving conveyor belt 26, the slab resting on top of the pins 132 with the latter projecting slightly into the meat. Through the drive described above, the conveyor belt is actuated and knives 154, whereby the meat is cut into longitudinal strips, the width of which will depend upon the distance between the individual cutting knives. The action of the fingers 178 and the downward drawing action of the knives will firmly embed the lonigtudinal strips of meat on the pins, the fingers 178 also acting as strippers to strip the cut strips of meat from the knives.

The longitudinal strips of meat continue to be carried along positively by the conveyor belt 26 since the pins 132 project into and hold the strips, and after the forward end of the meat has passed by the plane of the transverse cutting blade 214 a desired distance, the cam 126 actuates micro-switch 282 so that the latter energizes the valve controlling air into the piston cylinder 266. The piston rod 268 then drives the knife 214 in one direction across the table.

At this point, it is to be observed that the timing of the movement of the knife across the table is such that the knife will so move when it is approximately half-way between two adjacent pins, so that the knife does not strike the pins. As pointed out above, the air pressure applied to cylinder 266 and the whole arrangement of the drive for the knife carrying structure are such that the time for the knife to travel through one stroke, that is, from one side of the conveyor belt to the other, is approximately 37 milliseconds. The conveyor belt itself is so geared as to travel at an approximate rate of one inch per second. The knife, therefore, moves laterally through the meat lengths for cutting while the meat is moving a distance equal to or less than 0.037 inch. The normal compressibility of the meat will take up this motion without damage to the knife 214 and its carrying structure.

The meat continues to move along with the conveyor belt, and at the next desired length of meat, the cam 135 will operate its micro-switch 284 to cause a return high speed stroke of the knife blade across the meat strips on the conveyor belt, again severing the longitudinal strips to provide a plurality of cubes of meat. Again, it is to be noted that the return stroke takes place approximately midway between any pair of longitudinally adjacent pins. Once the cam wheels 126 and 127 are adjusted properly on the drive shaft 118, then the reciprocatory timing of the knife blade 214 does not change, and the knife blade will always traverse the conveyor belt in such manner as to avoid hitting any of the pins 132.

As has been pointed out above, as the meat traverses the circular cutting blades 154, the effect of the blades and the downward thrust of the fingers 178 is to force the meat firmly down on top of the pins 132. Observing, as clearly shown in FIG. 3, that as the conveyor belt bars 130 pass around the sprocket wheel 120, the pins 132 change their angular position with respect to each other from a parallel position to one of angularity, the pins stretch the longitudinal strips of meat so that these longitudinal strips of meat are in tension as they are being cut by the knife 214. The result of this is to provide an extremely clean and rapid transverse cutting of the longitudinal strips, a feature not found in prior art machines.

As indicated above, once the blade 214 has transversely cut the cubes of meat, the cubes are continued in their motion with the conveyor belt until the pins 132 are withdrawn from the top surface of the conveyor belt, with the result that the cubes of meat may fall into a suitable container placed below the machine.

In regard to the operation of the parallelogram that drives the knife 214, a feature that is to be noted is that the drive for the knife blade is located between the pivots 216 and 224 for each of the side arms of the parallelogram. As a result of this, the velocity of the knife blade 214 as measured in a direction transverse to the conveyor belt is faster than the velocity of the piston rod 268.

Another feature to be noted is that one of the great problems in cutting slabs of meat is the fact that a slab of meat tends to curve and not occupy a flat plane, whereas in automatic machinery for cutting meat, it is highly desirable to be sure that the meat passes over a flat plane. The pins 132 are essential to this because the action of the blades and the depressor bars 178 is such as to drive the meat down on top of the stripper plate 36 which is, of course, a flat plane. The pins then hold the meat strips in a flat plane and against curling while the transverse cuts are being made.

Referring now to FIGS. 8–13, there is shown a second embodiment of the apparatus of this invention, in which the conveyor belt moves intermittently on a start-stop basis, transverse cutting being done during the time that the conveyor belt is stopped, instead of having the conveyor belt move on the continuous basis as described above in the FIG. 1 embodiment.

The advantages of this second embodiment over the first embodiment is that since the conveyor belt is stopped during a transverse cutting action, there is no possibility of meat piling up behind the knife 214 as the latter makes its transverse cutting motions across the conveyor table. In some instances, if the friction between the knife 214 and the meat being cut slows down the knife, there will be a tendency for the meat to pile up against the knife and thus become compressed. When the knife is then withdrawn from the meat, the meat expands in a forward direction. The result of this is that, in some instances, the lengths of the chunks of meat will not be uniform. In this second embodiment, because of the transverse cutting is done while the conveyor belt (and thus the meat) is stationary, the lengths the chunks of meat will be uniform.

Figures 8, 9:
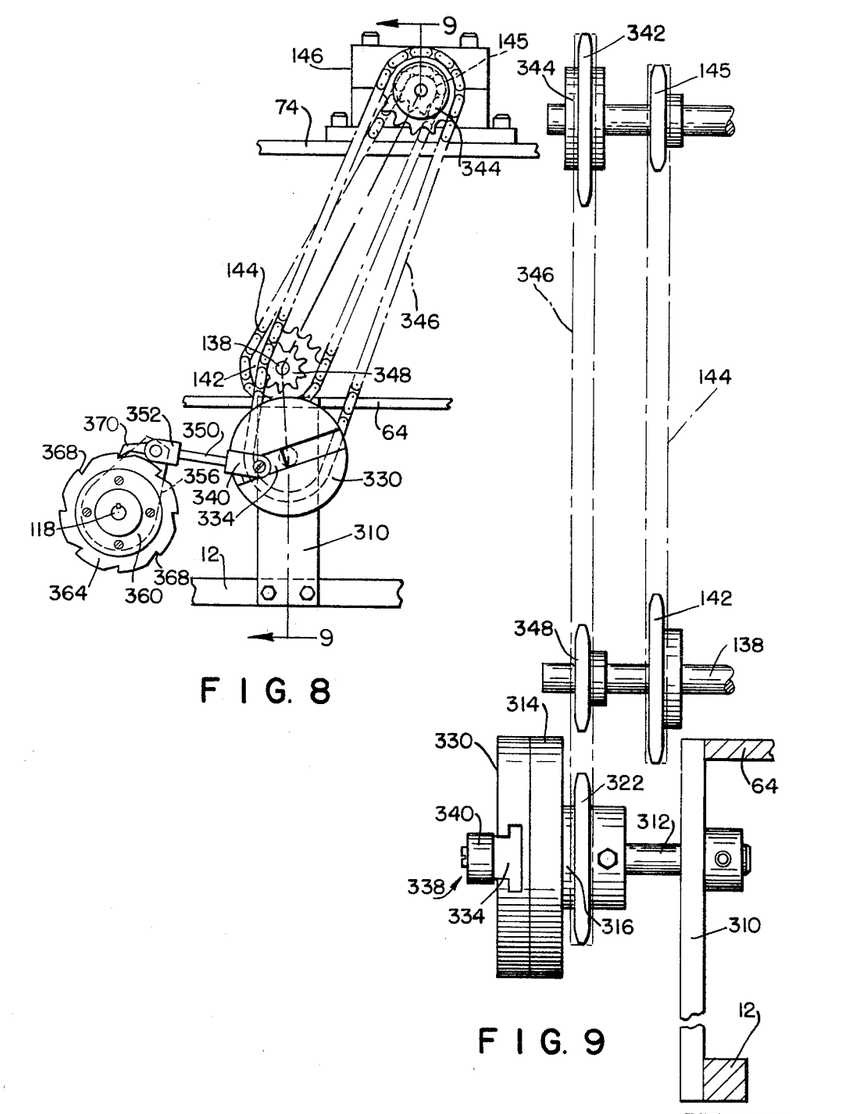
FIG. 8 is an elevation of a portion of a second embodiment of the invention.
FIG. 9 is an elevation of a portion of the drive for the FIG. 8 embodiment, taken on FIG. 8 in the direction of sight lines 9—9.
Figure 10:
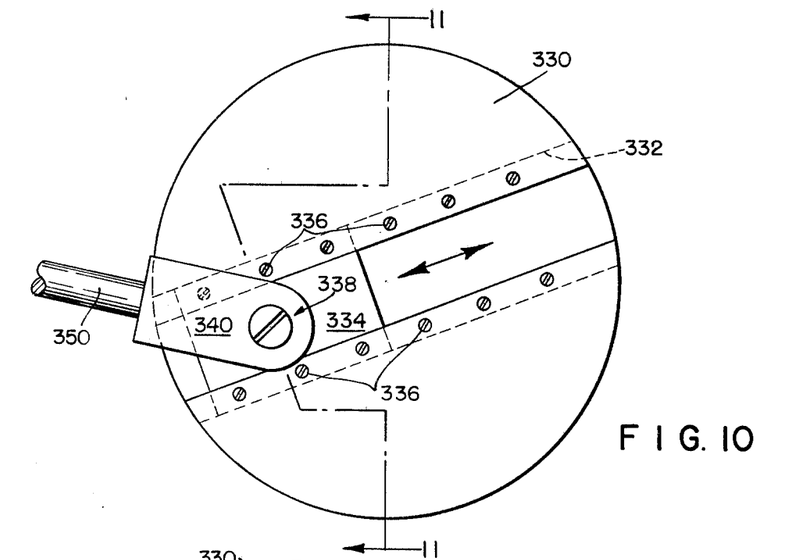
FIG. 10 is a front elevation of an eccentric drive for the second embodiment.
Figure 11:
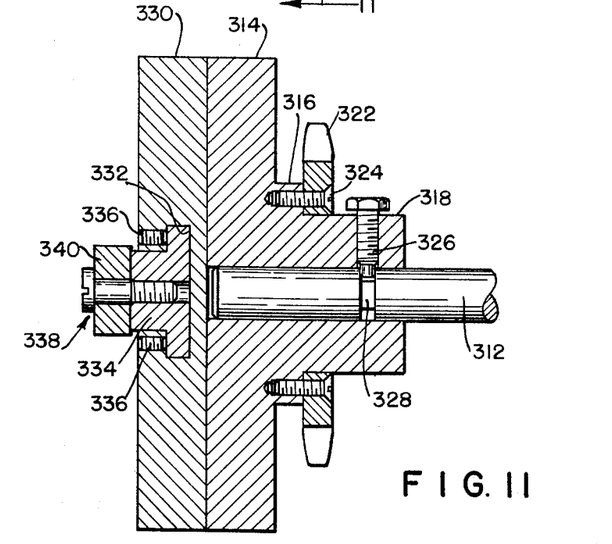
FIG. 11 is a sectional view of the FIG. 10 eccentric drive, taken in the direction of sight lines 11—11 thereon.
Figure 12:
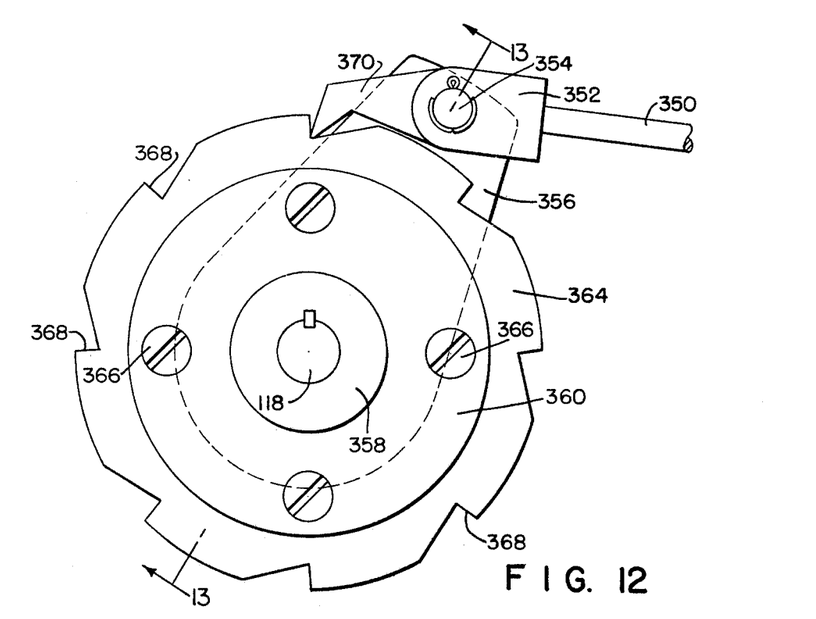
FIG. 12 is a front elevation of a ratchet mechanism forming part of the drive for the second embodiment.
Figure 13:
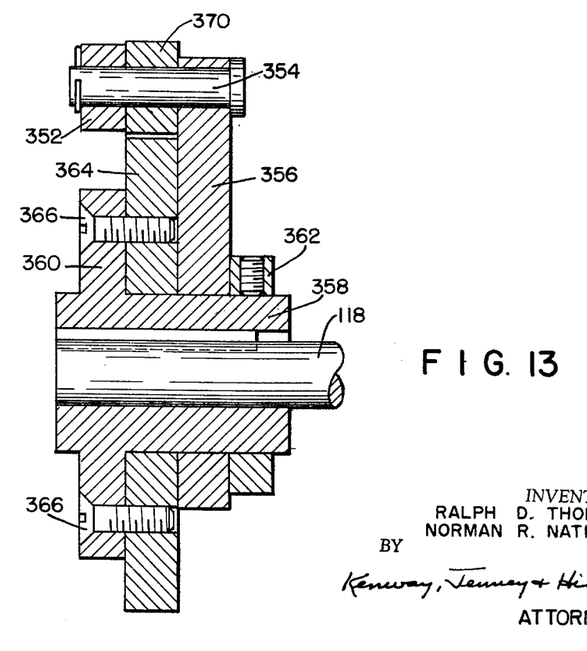
FIG. 13 is a sectional view of the FIG. 12 mechanism, taken in the direction of sight lines 13—13 thereon.

The machine essentially remains the same except for the drive for the conveyor belt, that is, the drive for the shaft 118. In FIG. 8, a portion of the machine of FIG. 1 is shown in elevation, with the top supporting plates 74 and the gear reduction unit 146, the latter having the output drive sprocket 145. Drive sprocket 145 drives, by means of sprocket chain 144, sprocket wheel 142 which, as indicated above, is mounted on the shaft 138 which drives the circular knives 154.

Mounted on a support 310 which is fastened by conventional means such as machine bolts to the rail 12, (in a manner similar to the fastening of the support plate 196), is a stub shaft 312, the shaft being fastened to the plate 310 by conventional means. Rotating on the stub shaft is a flanged plate 314 having a shouldered hub 316 provided with a shoulder 318 of lesser diameter. Mounted on the shoulder 318 is a sprocket wheel 322 which is fastened conventionally, (for example, by the machine screws 324) to the plate 314. A set screw 326 passes through the hub 318 and its inner end engages a peripheral groove 328 in the shaft 312 to hold the plate 314 rotatably on the shaft.

Fastened conventionally by means of machine screws to the flange 314 is a T-plate 330, that is, a plate having therein the T-shaped slot 332. Slidably mounted in the slot 332 is the T-block 334, this block being adjustably positioned and held in the T-slot by means of the set screws 336. Pivotally attached to block 334 by wrist-pin 338 is a wrist-pin block 340, the pin being threaded into the block 334.

Mounted on the output shaft of the gear reduction unit 146 is a sprocket wheel 342, the sprocket wheel being rotatable with respect to the shaft. A pair of plates 344 forming a friction clutch are mounted on the shaft, one one each side of the sprocket wheel 342, the plates being keyed to said shaft and engaging the faces of the sprocket wheel. The assembly of the friction clutch 344 and the sprocket wheel is conventional, and no further description will be given herein. It is sufficient to say that the purpose of using the friction clutch is to prevent damage if anything should stop the rotation of the sprocket wheels 322 and 342 in which the friction clutch will permit continued running of the gear reduction unit even though the sprocket wheels should be stopped, as by a jam in the conveyor belt. A sprocket chain 346 is trained on the sprockets 342 and 322, thus causing the gear reduction unit to drive the eccentric crank mechanism 330–334.

If desired, an idler sprocket wheel 348 may be mounted on the shaft 138, and by varying the diameter of this wheel proper tension may be imparted to the sprocket chain 346.

Extending from the block 340 is a crank shaft 350 the other end of which terminates in a wrist-pin block 352. Block 352 is pinned by means of the wrist-pin 354 to a rocker-plate 356 which is rotatably mounted on the hub 358 of a flanged circular mounting plate 360, (see FIGS. 12 and 13). The hub 358 is keyed to the drive shaft 118 which drives the conveyor belt 26. Fastened on the hub 358 is a collar 362 which serves to hold the rocker-plate on the hub.

Between the flange 360 and the rocker plate is mounted a circular ratchet-plate 364, this being attached to the flange 360 by means of conventional flat-headed machine screws 296. The ratchet-plate 364 is provided with eight ratchet teeth or detents 368 as shown, although greater or fewer detents may be used if desired. Pivotally mounted on wrist-pin 354 between the block 352 and rocker plate 356 is a pawl 370 so shaped as to engage the detents 368 and to move the ratchet plate thus turning the shaft 118 when the crank shaft 350 moves from right to left as viewed in FIG. 12.

Thus, in the second embodiment, as the sprocket 322 is turned by the gear reduction unit, the eccentric crank mechanism 330–334 will actuate the crank shaft 350 to move the ratchet plate 364 intermittently, and thus move the conveyor belt 26 intermittently. During the motion of the conveyor belt, the longitudinal strips of meat are cut by the knives 154 as described above. The cams 126 and 135 are so adjusted with respect to the micro-switches 282 and 284 that the transverse cutting means 30 is activated only during the period of time that the conveyor belt is stationary. This period of time will be the dwell period of the ratchet plate 364, and thus will be the time interval required for the eccentric plate 330 to move the crank shaft from left to right as viewed in FIG. 12.

The operation of this embodiment is as follows: Starting with the position of the knife 214 as shown in FIG. 1, the power drive actuates the crank shaft 350 to advance the ratchet plate 364 and move the meat on the pins 132 forward underneath the path of the knife 214. At this point, the crank shaft 350 has reached the extreme of its left-hand motion (as viewed in FIG. 12) so that the conveyor belt stops. The recess 280 in the cam 126 now permits the micro-switch 282 to close, this in turn actuating the cylinder and piston 268 to drive the knife downward and across the meat in order to sever the elongated strips into the required chunks. In the meantime, the crank shaft has been moving from left to right because of the continuous drive on the sprocket wheel 322, the knife 214 having made its transverse cut during the aforesaid dwell period. The crank shaft now again moves from right to left to advance the longitudinally cut meat beneath the path of the knife 214 (with the latter withdrawn). The conveyor belt again stops, and at this point a recess in the cam 135 permits micro-switch 284 to actuate the piston to drive the knife 214 again transversely across the meat in the other direction to sever further chunks of meat, this second passage of the knife again taking place during the period that the crank shaft 350 is moving from left to right, that is, while the conveyor belt is stationary. Thus, there is no possibility of meat piling up behind the knife 214, and the cut chunks of meat will be uniform in length.

To change the length of the cut pieces of meat, all that is necessary is to shift the position of T-block 334 in slot 332, thus varying the length of the stroke of the cam shaft. Of course, when this is done, cams 126 and 135 must also be changed so that the knife 214 will cut during the time that the conveyor belt is stationary.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

Having described the invention, what is claimed is:

1. Meat cutting apparatus comprising,
   a base,
   a conveyor on the base for carrying meat along a cutting path from a feed end to a discharge end,
   first drive means for operating said conveyor,
   a first cutter mounted on said base for engaging meat carried on the conveyor and having rotating cutting blades for cutting the meat into strips extending along said path,
   second drive means for rotating said first cutter blades for said cutting operation thereof during the movement of said conveyor,
   a second cutter engaging meat carried on said conveyor for cutting the meat transverse to said path, said second cutter including a meat-cutting blade mounted on said base for a swinging meat-slicing movement in a direction transverse to said path and successively from a first position spaced from said conveyor and out of said path toward said conveyor and into a second position in said path for said cutting of meat on said conveyor and to a further position spaced from said conveyor out of said path, and
   third drive means for moving said second cutter blade from said first position to said second position and to said further position with a continuous motion of said blade, said third drive means providing said operation in a time-dependent relation to the conveyor motion provided by said first drive means.

2. Apparatus as defined in claim 1 in which said first drive means operates to move the conveyor continuously, and
   said third drive means provides said operation of said second cutter blade during said continuous motion of said conveyor.

3. Apparatus as defined in claim 1 in which,
   said first drive means operates to move the conveyor intermittently with a dwell period during which the conveyor does not move, and
   said third drive means provides said operation of said second cutter blade solely during said dwell period.

4. Meat cutting apparatus comprising,
   a base,
   a conveyor on the base for carrying meat along a cutting path from a feed end to a discharge end,
   a first cutter mounted on said base for engaging meat carried on the conveyor and for cutting it into strips extending along said path,
   a second cutter engaging meat carried on said conveyor for cutting the meat transverse to said path, said second cutter including a meat-cutting blade mounted on said base for a reciprocating swinging meat-slicing movement in a direction transverse to said path and with each swinging movement being successively from a position spaced from said conveyor and out of said path toward said conveyor and into a second position in said path for said cutting of meat on said conveyor and to a further position spaced from said conveyor out of said path, and resiliently-biased pressure means mounted with said base and engaged by said second cutter in the swinging movement thereof toward said position spaced from said conveyor for movement of said pressure means for a normal position against the resilient bias thereof to store potential energy, said pressure means releasing said stored potential energy to impart kinetic energy to the swinging movement of said second cutting member from said position spaced from said conveyor to said meat cutting position in said path.

5. Automatic apparatus for cutting meat in two transverse directions to cut the meat into chunks or the like, said apparatus comprising, conveyor means for carrying the meat along a path for said cutting operations on it, first drive means for operating said conveyor to advance meat thereon along said path, a first meat-cutting member having plural rotary cutting blades spaced apart from each other across said path and disposed for cutting meat carried on said conveyor means, with the direction of cutting being along said path, second drive means for rotating said cutting blades continuously as said first drive means advances said conveyor means, a second meat-cutting member having a slicing blade extending transverse to said path and mounted on a pair of parallel swinging arms, said blade and said arms being arranged to swing transverse to said path to move said blade across said path to slice meat carried on said conveyor means, with the direction of said slice being across said path, said movement being a continuous swinging motion successively from a non-cutting position that is to the side of said conveyor means to be out of said path, into a cutting position in said path for said meat slicing operation, and to a non-cutting position that is to the side of said conveyor means to be out of said path, and third drive means for moving said cutting blade through said continuous swinging motion, said third drive means operating in a time-dependent relation relative to said operation of said conveyor-advancing first drive means.

6. Apparatus as defined in claim 5, further comprising meat-holding means carried on said conveyor means for restraining said meat from movement in a direction laterally transverse to said path and for stretching the meat along said path at the engagement of said slicing blade with said meat on said conveyor, further comprising resiliently-biased pressure means mounted with said base and engaged by said slicing blade in the swinging movement thereof toward a non-cutting position for movement of said pressure means from a normal position against the resilient bias thereof to store potential energy, said pressure means releasing said stored potential energy, said pressure means releasing said stored potential energy to impart kinetic energy to the swinging movement of said slicing blade from a non-cutting position to said cutting position, and in which said third drive means operates to provide said blade-swinging motion during conveyor-advancing operation of said first drive means, so that said conveyor carries meat along said path with a substantially continuous motion.

7. Cutting apparatus for meat comprising, a base, a horizontally movable conveyor belt mounted on the base, means for advancing the conveyor belt along a first direction, a first meat cutting member having plural cutting edges disposed in spaced-apart relation to each other laterally across the conveyor belt in a second direction transverse to said first direction, said first cutting member being movable for cutting along said first direction, the cutting edges of said first member being adapted to cut through meat carried on the conveyor belt, means for driving said first cutting member for said cutting operation, a second cutting member comprising a cutting blade disposed above the conveyor belt and elongated in said second direction and mounted on said base for movement from a non-cutting position out of the path of meat carried on the belt along said second direction into a cutting position where it is in said path to cut with a slicing action along said second direction meat carried on the belt, and for subsequent movement to a non-cutting position, and means for moving said cutting blade successively from a non-cutting position to said cutting position and to a non-cutting position to cut meat passing on said conveyor belt past said blade when it is in a non-cutting position, said means for moving said cutting blade providing said successive-moving operation during said operation of said means for advancing said belt, and said means for moving the cutting blade comprising a pair of first arms each of which is pivotally fastened at first points thereon to the base and extending toward the conveyor belt, and a second arm pivotally joining the first arms at second points thereon such that the first arms and the second arm and the span between the first points define a parallelogram lying across the conveyor belt with its plane transverse to the conveyor belt and to said first direction, said cutting blade being attached to the parallelogram structure for movement thereby, and reciprocable means for moving said first arms about their first points so as to move said cutting blade in said second direction and toward said conveyor belt, said reciprocable means being attached to one of said first arms at a point between said first points and the second cutting member, whereby the velocity of the cutting blade is greater than the velocity of said reciprocable means.

8. The apparatus of claim 7 in which said reciprocable means is a fluid operated piston, the cylinder of the piston being fastened to the base to one side of said parallelogram, and the outer end of the piston rod having its reciprocating motion in a plane parallel to the plane in which said parallelogram swings, said outer end being pivotally connected to one end of a connecting rod, the other end of the latter being pivotally connected to that one of said first arm lying furthest from said cylinder.

9. Cutting apparatus for meat comprising, a base, a horizontally movable conveyor belt mounted on the base and comprising a plurality of bars lying parallel to each other and extending in a second direction transverse to a first direction and fastened to at least one endless belt, means for advancing the conveyor belt along the base in said first direction and including rotatable supporting rolls mounted on the base at the ends thereof, with said endless belt trained on said rolls and movable thereby to carry the bars past first and second cutting members in said first direction, a plurality of first cutting members having cutting edges and being mounted in spaced-apart relation to each other laterally across the conveyor belt in said second direction, said first cutting members being movable for cutting along said first direction, the cutting edges of said first members being adapted to cut through meat carried on the conveyor belt, means for driving said first cutting members for said cutting operation, means for holding meat on said conveyor belt, said holding means comprising a plurality of pointed pins fastened to a plurality of said bars and extending from faces of said bars toward said first cutting members, the pins being spaced apart in rows extending in both of said first and second directions, the spacing of the pins in said second direction being such that the pins pass between said first cutting members as the conveyor belt moves past said first cutting members, the points of the pins in a row extending in said second direction moving away from the points of pins in a succeeding such row as the respective bars holding the pins pass around said supporting rolls, whereby said pins are adapted to stretch meat engaged by said points, a second blade-like cutting member disposed above the conveyor belt extending in said second direction and mounted on said base for movement from a non-cutting position out of the path of meat carried on the belt along said second direction into a cutting position where it is in said path to cut with a slicing action along said second direction meat carried on the belt, and for subsequent movement to a non-cutting position, said second cutting member being disposed proximal to the passage of said bars around said supporting rolls so as to cut meat being stretched by said pins on said bars, and means for moving the second cutting member successively from a non-cutting position to said cutting position and to a non-cutting position to cut meat passing on said conveyor belt past said second cutting member when it is in a non-cutting position.

10. Cutting apparatus for meat comprising, a base, a horizontally movable conveyor belt mounted on the base, means for advancing the conveyor belt along a first direction, a plurality of first cutting members having cutting edges and being mounted in spaced-apart relation to each other laterally across the conveyor belt in a second direction transverse to said first direction, said first cutting members being movable for cutting along said first direction, the cutting edges of said first members being adapted to cut through meat carried on the conveyor belt, means for driving said first cutting members for said cutting operation, a second blade-like cutting member disposed above the conveyor belt extending in said second direction and mounted on said base for movement from a non-cutting position out of the path of meat carried on the belt along said second direction into a cutting position where it is in said path to cut with a slicing action along said second direction meat carried on the belt, and for subsequent movement to a non-cutting position, means for moving the second cutting member successively from a non-cutting position to said cutting position and to a non-cutting position to cut meat passing on said conveyor belt past said second cutting member when it is in a non-cutting position, meat holding pins carried on said conveyor belt and spaced to pass between said first cutting members as the conveyor belt moves past said first cutting members, and a plurality of elongated flat fingers overlying said conveyor belt and extending between said first cutting members, said fingers being below the points of said pins as said pins pass between the first cutting member, said fingers extending over the conveyor belt for at least a portion of the distance beyond the exit side of the first cutting members, thereby to support meat being cut by the first cutting members during the cutting operation.

11. The apparatus of claim 10, including a plurality of stripper fingers mounted on said base and lying between the first cutting members, said fingers being resiliently biased toward said elongated flat fingers, thereby to strip meat from said first cutting members as said members perform their cutting action.

12. The apparatus of claim 9 further comprising means for removing cut meat from the conveyor belt and comprising a plurality of elongated curved elements extending along said conveyor belt and over the exit end of said base, said curved elements being spaced apart sufficiently to permit passage therebetween of the pins, and the outer surface of said curved elements constituting a curved surface whose radius of curvature and position in respect to the curved surface traversed by the points of all of said pins as the conveyor belt rotates around said supporting roller are such that, as said rotation occurs, the points of said pins are withdrawn into a space formed between said curved elements and said conveyor belt thereby pulling the pins from cut meat so that meat may fall downwardly from the apparatus.

13. Cutting apparatus for meat comprising:

a base;

a horizontally movable conveyor belt on the base and comprising a plurality of bars lying parallel to each other and extending in a direction perpendicular to said first direction, means for moving the conveyor belt in a first direction along the base;

a plurality of first cutting members having cutting edges and being mounted in spaced-apart relation to each other laterally across the conveyor belt in a direction perpendicular to said first direction, said first cutting members being movable for cutting in a direction parallel to said first direction, the cutting edges of said first members being adapted to cut through meat carried on the conveyor belt;

means for driving said first cutting members;

a second cutting member movably mounted on the base and extending over the conveyor belt in a direction across said first direction;

means for moving the second cutting member both in said second direction and toward the conveyor belt, the motion toward the belt being sufficient to enable the second cutting member to cut through said meat;

means for removing cut meat from the conveyor belt;

rotatable supporting rolls mounted on the base at the ends thereof and having at least one endless belt trained thereon, said conveyor-belt bars being fastened to said endless belt and movable thereby to carry the bar past said first and second cutting members in said first direction, means for holding meat on said conveyor belt, said means comprising a plurality of pointed pins fastened to a plurality of said bars and extending from the faces of said bars toward said first cutting members, the pins being spaced apart in rows extending in both of said first and second directions, the spacing of the pins in said second direction being such that the pins pass between said first cutting members as the conveyor belt moves past said first cutting members, the points of the pins in a row extending in said second direction moving away from the points of pins in a succeeding such row as the respective bars holding the pins pass around said supporting rolls, thereby being adapted to stretch meat engaged by said points, and timing means for causing motion of said second cutting members to take place between the rows of pins extending in said second direction.

14. The apparatus of claim 13 in which said timing means comprises a switch operated by a cam, said cam being operated by motion of the conveyor belt drive.

15. The apparatus of claim 12 in which said switch controls an electromagnetic valve, said valve controlling said piston.

16. Cutting apparatus for meat comprising:

a base;

a horizontally movable conveyor belt on the base;

means for moving the conveyor belt in a first direction along the base;

a plurality of first cutting members having cutting edges and being mounted in spaced-apart relation to each other laterally across the conveyor belt in a direction perpendicular to said first direction, said first cutting members being movable for cutting in a direction parallel to said first direction, the cutting edges of said first members being adapted to cut through meat carried on the conveyor belt;

means for driving said first cutting members;

a second cutting member including an elongated cutting blade movably mounted on the base and extending over the conveyor belt in a second direction across said first direction;

means for moving the second cutting member both in said second direction and toward the conveyor belt, the motion toward the belt being sufficient to enable the second cutting member to cut through said meat, said blade-moving means comprising a pair of elongated first arms each being pivotally fastened at first points thereon to the base and extending toward the conveyor belt, and an elongated second arm pivotally joining the first arms at second points thereon such that the first and second arms and the span between the first points define a parallelogram lying across the conveyor belt with its plane perpendicular to the conveyor belt and to said first direction, said second cutting member being attached to the parallelogram for movement thereby, and reciprocable means for moving said first arms about their first points, whereby said second cutting member moves in said second direction and toward said conveyor belt, a plurality of pressure pads mounted on said base and resiliently biased toward said conveyor belt, and a tie bar connecting said first arms, said bar being adapted to come to rest against and move said pressure pads against their bias at the end of each operation of said second cutting member, whereby to store potential energy, said potential energy being releasable to impart kinetic energy to the motion of the second cutting member at least at the commencement of a cutting operation of said second cutting member; and means for removing cut meat from the conveyor belt.

17. Meat cutting apparatus comprising:

a base;

a conveyor on the base for carrying meat along a cutting path from a feed end to a discharge end;

a first cutter mounted on said base for engaging meat carried on the conveyor and for cutting it into strips extending along said path;

a second cutter engaging meat carried on said conveyor for cutting the meat transverse to said path, said second cutter including a meat-cutting blade mounted on said base for a swinging meat-slicing movement in a direction transverse to said path successively from a position spaced from said conveyor and out of said path toward said conveyor and into said path for said cutting of meat on said conveyor and to a position spaced from said conveyor out of said path; and meat-holding means carried on said conveyor for restraining said meat from movement along said transverse direction and for stretching the meat along said path at the engagement of said second cutter with said meat on said conveyor.

References Cited

UNITED STATES PATENTS

| 34,573 | 3/1862 | Hermance | 146—138 |
| 885,274 | 4/1908 | Mosteller | 146—138 |
| 1,007,721 | 11/1911 | Meyer | 146—98 |
| 1,016,740 | 2/1912 | Ellison | 198—178 X |
| 1,840,095 | 1/1932 | Henry. | |
| 2,241,648 | 5/1941 | Spang | 146—98 |
| 2,358,000 | 9/1944 | Cornell. | |
| 2,827,001 | 3/1958 | Curioni | 146—78 |

FOREIGN PATENTS 45,786  5/1939  Netherlands.

ANDREW R. JUHASZ, Primary Examiner

Z. R. BILINSKY, Assistant Examiner

U.S. Cl. X.R.

146—133

PO-1050
(5/69)

UNITED STATES PATENT OFFICE
CERTIFICATE OF CORRECTION

Patent No. 3,502,127      Dated March 24, 1970

Inventor(s) Norman R. Nathanson and Ralph D. Thompson

It is certified that error appears in the above-identified patent and that said Letters Patent are hereby corrected as shown below:

Column 6, line 4, "theaded" should be --threaded--.

Column 7, line 3, change "foth" to --with--.

Column 7, line 44, change "14" to --214--.

Column 10, line 67, change "one" to --on--.

Column 10, line 74, insert --case-- after "which".

Column 13, lines 63 and 64, delete the phrase "said pressure means releasing said stored potential energy,".

SIGNED AND SEALED
NOV 10 1970

(SEAL)
Attest:

Edward M. Fletcher, Jr.
Attesting Officer

WILLIAM E. SCHUYLER, JR.
Commissioner of Patents